July 25, 1939.   C. E. DUNZ   2,167,264
REFRIGERATING APPARATUS
Filed April 6, 1937
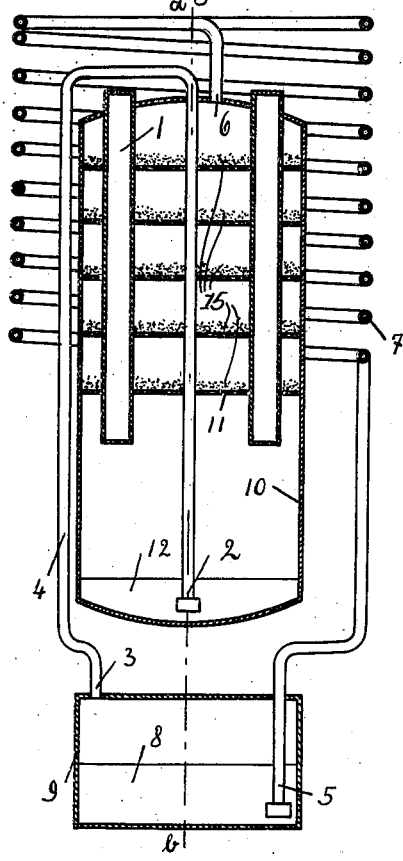
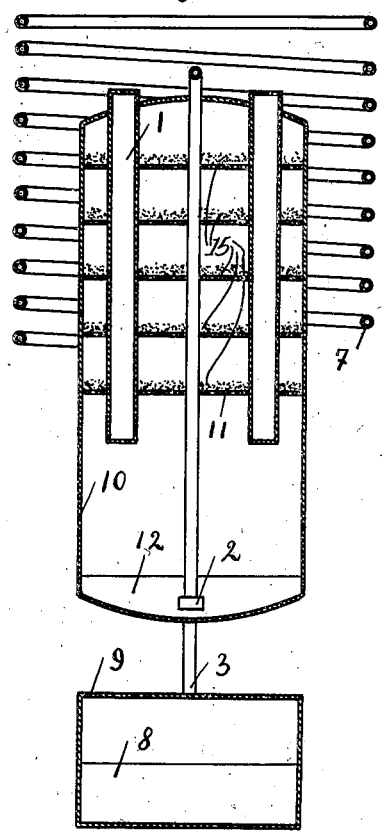
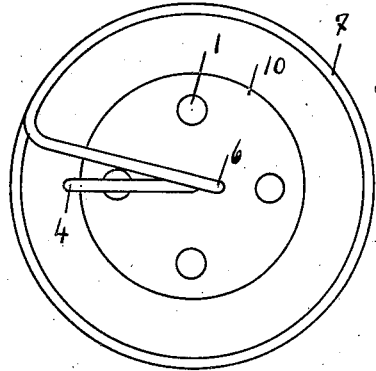
WITNESSES.
INVENTOR.

Patented July 25, 1939

2,167,264

UNITED STATES PATENT OFFICE 2,167,264

REFRIGERATING APPARATUS

Carl Eugen Dunz, Wallisellen, Switzerland

Application April 6, 1937, Serial No. 135,292
In Germany April 14, 1936

1 Claim. (Cl. 62—118)

My invention relates to a refrigerating apparatus which is built as a dry absorption machine and has for its object the application of an indifferent liquid in the boiler.

Reference is to be had to the accompanying drawing in which

Fig. 1 shows a section through the apparatus,

Fig. 2 shows a section according to line $a$—$b$ of the Fig. 1,

Fig. 3 shows a top view.

The boiler 10 is fitted with the pipes 1 which carry electrical heating coils. One end 2 of the pipe 4 reaches nearly to the bottom of the boiler 10 and the other end 3 is fixed to the top of the evaporator 9. The perforated plates 11 are fixed to the boiler 10 and dry absorption material 15 for instance calcium chlorid is placed on the plates 11. A liquid 12 for instance paraffine oil rests on the bottom of the boiler 10. The liquid is indifferent to the refrigerant fluid used and is not affected by the changing temperatures. The end 2 of the pipe 4 is covered by the liquid 12. The latter is placed for away from the heating part of the boiler. The lower part of the boiler can be cooled by water if necessary. The pipe 6 arranged in the upper part of the boiler leads to the condenser 7 and to the bottom of the evaporator 9. The end 5 is covered by liquid refrigerant for instance ammonia.

The apparatus works in the following way:

The heating coils of the pipes 1 are heated during the heating period, which transmit heat to the boiler. The effect of the heat is that the vapors of the ammonia are separated from calcium chlorid and the vapors are led through the pipe 6 into condenser 7 where the vapors condense to liquid and the liquid thus formed passes through the end of pipe 5 to the liquid ammonia 8 in evaporator 9. The ammonia is collected as liquid in the bottom of the evaporator 9. As the end 2 of the pipe 4 is shut by the liquid 12 the vapors of ammonia cannot reach the evaporator through the pipe 4. As soon as the level of the liquid 8 has reached a certain height, the heating of the electrical coils of the pipes 1 is stopped and the cooling period starts. The temperature decreases and at the same time the pressure decreases. The liquid ammonia 8 starts to evaporate and the vapors flow to the boiler 10 through the end 3 of the pipe 4, the end 2 and the liquid 12. The vapors are absorbed by the calcium chlorid. Coldness is effected by the evaporation of the ammonia. The characterising feature of the apparatus is that the vapors of the cooling liquid flow through the condenser only during the heating period, while they do not flow through the condenser during the cooling period. Therefore the vapors flow through two different passages. One passage is shut in the boiler by the indifferent liquid and the other passage is shut in the evaporator by the liquid ammonia.

I claim:

In an absorption apparatus the combination of a boiler and an evaporator, fitted with refrigerant fluid partly in the liquid and partly in the vapor state, a solid absorbent material located on perforated plates in the top of the boiler and liquid, indifferent to the refrigerant fluid used and not affected by the changing temperatures, located in the bottom of the boiler, closing the end of a pipe leading directly to the top of the evaporator, another pipe leading from the top of the boiler to a condenser which is connected to the bottom of the evaporator.

CARL EUGEN DUNZ.